(12) United States Patent
Axmon et al.

(10) Patent No.: US 10,334,453 B2
(45) Date of Patent: Jun. 25, 2019

(54) METHOD OF NEIGHBOR CELL DETECTION

(71) Applicant: Telefonaktiebolaget LM Ericsson (publ), Stockholm (SE)

(72) Inventors: Joakim Axmon, Malmo (SE); Bengt Lindoff, Bjarred (SE); Reza Moosavi, Linkoping (SE); Claes Tidestav, Balsta (SE); Edgar Ramos, Kirkkonummi (FI)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 130 days.

(21) Appl. No.: 15/470,305

(22) Filed: Mar. 27, 2017

(65) Prior Publication Data
US 2018/0262920 A1     Sep. 13, 2018

(30) Foreign Application Priority Data

Mar. 10, 2017   (EP) .................................. 17160372

(51) Int. Cl.
*H04W 24/02*   (2009.01)
*H04W 48/16*   (2009.01)
*H04W 24/08*   (2009.01)
*H04W 56/00*   (2009.01)

(52) U.S. Cl.
CPC ........... *H04W 24/02* (2013.01); *H04W 24/08* (2013.01); *H04W 48/16* (2013.01); *H04W 56/001* (2013.01); *H04W 56/00* (2013.01)

(58) Field of Classification Search
CPC ..................................................... H04W 24/02
USPC ........................................................ 370/329
See application file for complete search history.

(56) References Cited

U.S. PATENT DOCUMENTS

| | | | |
|---|---|---|---|
| 2007/0033057 A1* | 2/2007 | Covell | G10L 21/04 704/503 |
| 2016/0127936 A1* | 5/2016 | Chatterjee | H04B 7/0626 370/252 |
| 2016/0226612 A1* | 8/2016 | Axmon | H04J 11/005 |
| 2017/0041112 A1 | 2/2017 | Kim et al. | |

OTHER PUBLICATIONS

European Communication dated Aug. 22, 2017 in connection with European Application No. 17160372.3, 14 pages.
PCT International Search Report, dated Mar. 29, 2018, in connection with International Application No. PCT/EP2018/054571, all pages.

(Continued)

*Primary Examiner* — Shripal K Khajuria
(74) *Attorney, Agent, or Firm* — Leffler Intellectual Property Law, PLLC

(57) ABSTRACT

A method of neighbor cell detection performed in a communication device is disclosed. The method comprises selecting at least one subband-time interval resource for processing, wherein each subband is part of a system frequency bandwidth and each time interval is a part of a synchronization signal repetition time period, recording one or more radio samples associated with the at least one subband-time interval resource, executing cell detection on the recorded radio samples, and repeating the selecting, recording and executing until a stop criterion is fulfilled. A corresponding communication device computer program and computer program product are also provided.

12 Claims, 5 Drawing Sheets

(56) References Cited

OTHER PUBLICATIONS

PCT Written Opinion, dated Mar. 29, 2018, in connection with International Application No. PCT/EP2018/054571, all pages.
3GPP TSR RAN WG1 #85, R1-163997, Nanjing, China, May 23-27, 2016, Samsung, "Cell search for NR: design consideration", 6 pages.
3GPP TSG RAN WG1 Meeting #87, R1-1611684, Reno, USA, Nov. 14-18, 2016, Huawei, "Email discussion [86b-20] on synchronization and carrier rasters for NR", 11 pages.
3GPP TSG RAN WG1 Meeting #68bis, R1-121407, Jeju, Korea, Mar. 26-30, 2012, HTC, "Synchronization Signals and Procedure for Unsynchronised New Carriers", 3 pages.
3GPP TSR RAN WG1 Meeting #58, R1-093535, Shenzhen, China, Aug. 24-28, 2009, CATT, ZTE, "Discussion on UE behavior during initial access for carrier aggregation system", 2 pages.
Andreas Roessler, "Cell search and cell selection in UMTS LTE Application Note", Sep. 17, 2009, http://www.rohde-schwarz.com/en/applications/cell-search-and-cell-selection-in-umts-lte-application-note_56280-15428.html, 40 pages.

\* cited by examiner

METHOD OF NEIGHBOR CELL DETECTION

CROSS-REFERENCE TO RELATED APPLICATIONS

This application claims priority under 35 U.S.C. § 119 of European Patent Application No. EP17160372.3, filed on Mar. 10, 2017, which application is hereby incorporated herein by reference in its entirety.

TECHNICAL FIELD

The technology disclosed herein relates generally to the field of wireless communication, and in particular to a method of neighbor cell detection, a communication device, computer program and computer program product.

BACKGROUND

Current standards for wireless communications systems, e.g. Long Term Evolution (LTE), support flexible bandwidth: from 1.4 MHz up to 20 MHz and also wider bandwidths using carrier aggregation techniques. In order for a communication device, exemplified in the following by a user equipment (UE), to connect to a network node (e.g. eNodeB in case of LTE) the UE needs to determine the cell carrier frequency as well as the system bandwidth to use. Furthermore, in current LTE standards there is a requirement for the network node and the UE to support and connect using the same system bandwidth. Hence the UE must search for e.g. control messages over the entire system bandwidth of the network node.

For the upcoming new radio-access technology in 5G, denoted NR herein, a more generic approach is desirable with respect to the system bandwidth of the respective network nodes. NR should support several different types of UEs/devices, from high end mobile broadband UEs capable of up several GHz system bandwidth, down to low-cost low-power Machine-Type Communications (MTC) devices, possibly only supporting some too kHz up to some MHz bandwidth. Hence a desired requirement is that the UE, supporting for instance a 100 MHz bandwidth, could be allocated a dedicated UE system bandwidth, denoted scheduling bandwidth, anywhere within the total system bandwidth of a next generation base station (denoted gNodeB). As a particular example, the scheduling bandwidth may be maximum 100 MHz while the total system bandwidth may be 1000 MHz. It is also desirable that the gNodeB can allocate a smaller scheduling bandwidth than the one supported by the UE.

In NR it is proposed that the UE relies on synchronization signals for cell detection. The synchronization signals will not fill up the entire system bandwidth of the gNodeB, but instead only a subband (i.e. only part of the bandwidth). The subband will be configured by the serving network node/serving beam, that informs adjacent nodes which subband to use. The UE is also informed about the subband to use in order to know where to find the synchronization signals.

In NR there might not be fixed location (i.e. fixed location in time and/or frequency) of the synchronization signals as in the LTE legacy system. Hence the UE will have to search both in frequency and time within the system bandwidth when searching for intra-frequency neighbor cells.

In the LTE legacy system, synchronization signals are transmitted over six central resource blocks (RBs) (1.4 MHz) every 5 milliseconds (ms), and hence for cell detection as well as mobility measurements it is sufficient to operate on radio samples at a sampling rate of 1.92 MHz, although the system bandwidth might be 20 MHz by which radio samples are acquired at a 30.72 MHz sampling rate. This allows UE implementations to record and post-process radio samples for cell detection and mobility measurements, where the post-processing can be carried out when physical resources such as hardware (HW) accelerators and Digital Signal Processors (DSPs) are idling. This results in a lower UE complexity than if the UE would need to carry out all operations, communication tasks as well as cell detection, in real-time.

With the increased repetition period of synchronization signals in NR compared to LTE (for instance, too ms instead of 5 ms), and the flexibility with respect to which subband the synchronization signal is transmitted in, it becomes challenging for the UE to detect intra-frequency neighbor cells without a dramatic increase in UE complexity, in terms of memory requirements, processing capabilities, or both, compared to current LTE.

From the above it is realized that there is a need for NR cell detection without increasing complexity and hence cost of the communication devices.

SUMMARY

An objective of the present teachings is to address and improve various aspects for next generation radio access technologies. A particular objective is to provide methods and devices by means of which communication devices (e.g. UEs) can perform NR cell detection in an efficient way. Another particular objective is to enable such NR cell detection without increasing complexity of the communication devices. These objectives and others are achieved by the methods, devices, computer programs and computer program products according to the appended independent claims, and by the embodiments according to the dependent claims.

The objective is according to an aspect achieved by a method of neighbor cell detection performed in a communication device. The method comprises selecting at least one subband-time interval resource for processing, wherein each subband is part of a system frequency bandwidth and each time interval is a part of a synchronization signal repetition time period; recording one or more radio samples associated with the at least one subband-time interval resource; executing cell detection on the recorded radio samples; and repeating the selecting, recording and executing until a stop criterion is fulfilled.

The method provides a number of advantages. For instance, the method enables communication devices to do cell detection without increasing their complexity. In particular, by means of the method, the communication devices require less memory for storage of radio samples than if the full system bandwidth would be recorded. Further, hardware, such as for instance digital signal processors and hardware accelerators that are used for the cell detection operate at lower sample rate than if the whole system bandwidth would be sampled and stored. Still further, the digital signal processors and hardware accelerators can be more efficiently utilized.

The objective is according to an aspect achieved by a computer program for a communication device. The computer program comprises computer program code, which, when run on at processing circuitry of the communication device causes the communication device to perform the method as above.

The objective is according to an aspect achieved by a computer program product comprising a computer program as above and a computer readable means on which the computer program is stored.

The objective is according to an aspect achieved by a communication device for neighbor cell detection. The communication device is configured to: select at least one subband-time interval resource for processing, wherein each subband is part of a system frequency bandwidth and each time interval is a part of a synchronization signal repetition time period; record one or more radio samples associated with the at least one subband-time interval resource; execute cell detection on the recorded radio samples; and repeat the selecting, recording and executing until a stop criterion is fulfilled.

Further features and advantages of the embodiments of the present teachings will become clear upon reading the following description and the accompanying drawings.

DETAILED DESCRIPTION

Figure 1:
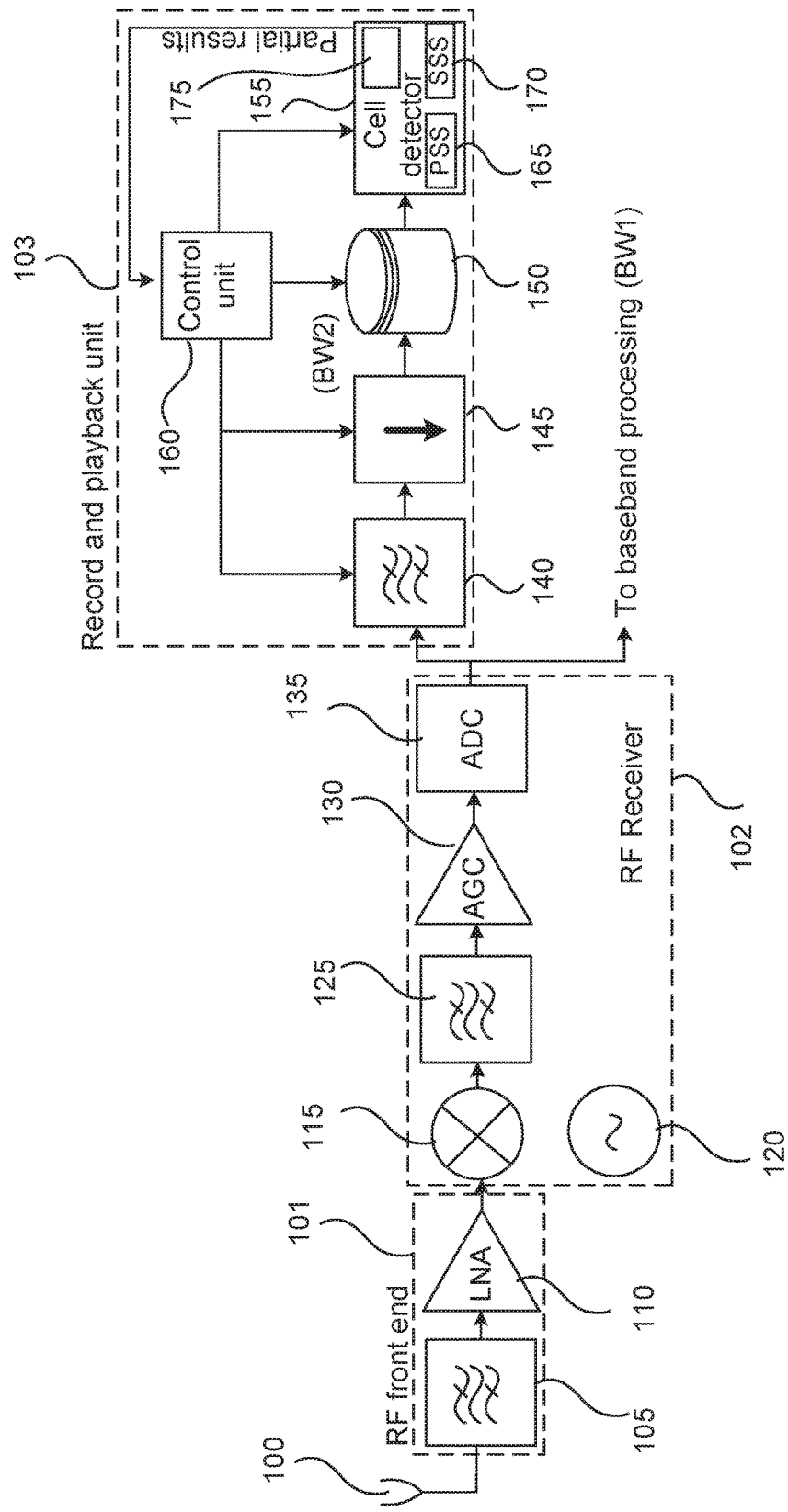
FIG. 1 illustrates receiver circuitry according to embodiments of the present teachings.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, in various embodiments, a communication device, e.g. UE, records and post-processes radio samples for the purpose of cell detection. The UE may operate over one or more subbands at a time, and over a time-interval that may be shorter than the synchronization signal repetition period.

FIG. 1 illustrates receiver circuitry according to embodiments of the present teachings. A communication device may comprise such receiver circuitry for implementing various embodiments of the cell detection method disclosed herein. The receiver circuitry comprises a Radio Frequency (RF) front end 101, a RF receiver part 102 and a Record and playback unit 103. The communication device typically also comprises a baseband processing part (as indicated in the figure).

In the RF front end 101, RF signals are received via an antenna 100 and passed to through a bandpass filter 105 and amplified by a low-noise amplifier (LNA) 110. In the RF receiver part 102, the RF signal is mixed down to a baseband signal by a mixer 115 that is controlled by an oscillator 120. The baseband signal is passed through a low pass filter 125 that suppresses interference outside the bandwidth of interest. The low pass filtered baseband signal is subjected to automatic gain control (AGC) 130 and converted to a digital signal by an analog-to-digital converter (ADC) 135.

The signal on the output of the ADC 135 of the RF receiver part 102 has a bandwidth that may be anywhere in the range of a subband up to the full system bandwidth. The signal, having a first bandwidth BW1, is fed to digital baseband circuitry (not shown) for further processing. The same signal is also fed to a Record and Playback unit 103, comprising a bandpass filter 140, a decimator 145, and a memory/storage 150. After having passed the decimator 145 the signal has a second bandwidth BW2 which may be smaller than the first bandwidth BW1. However, it is noted that in some scenarios and embodiments, the first bandwidth BW1 and the second bandwidth BW2 may be the same (identical).

A control unit 160 may be provided for configuring the operation of the bandpass filter 140, the decimator 145 and the storage 150. The control unit 160 may be configured to determine which subband of the first and second bandwidths BW1, BW2 (BW2<BW1) to record, and in which time interval with respect to the repetition period of the synchronization signals. Once a time interval has been recorded for a subband ("subband time interval"), the control unit 160 marks that subband time interval as having been processed, and consequently should not select that particular subband time interval for processing again until all other such subband time intervals over the resource grid constituted by the system bandwidth (or the part thereof where synchronization signals can be transmitted) and the synchronization signal periodicity have been processed. The synchronization repetition period may be broken down into one or more shorter time intervals.

The recorded signal may be processed in an offline fashion by a cell detection unit 155 which may comprise a Primary Synchronization Signal (PSS) detection unit 165 and a Secondary Synchronization Signal (SSS) detection unit 170. In some embodiments the cell detection unit 155 also comprises a measurement unit 175 for performing signal strength measurements on mobility pilots or synchronization signals. Examples on signal strength measurements comprise Reference Signals Received Power (RSRP), Reference Signal Received Quality (RSRQ), Received Signal Strength Indicator (RSSI), Reference Signal-Signal-to-interference-plus-noise ratio (RS-SINR) and similar. Such measurement may, for instance, be used for cell or beam verification or for mobility purposes.

Figure 2:
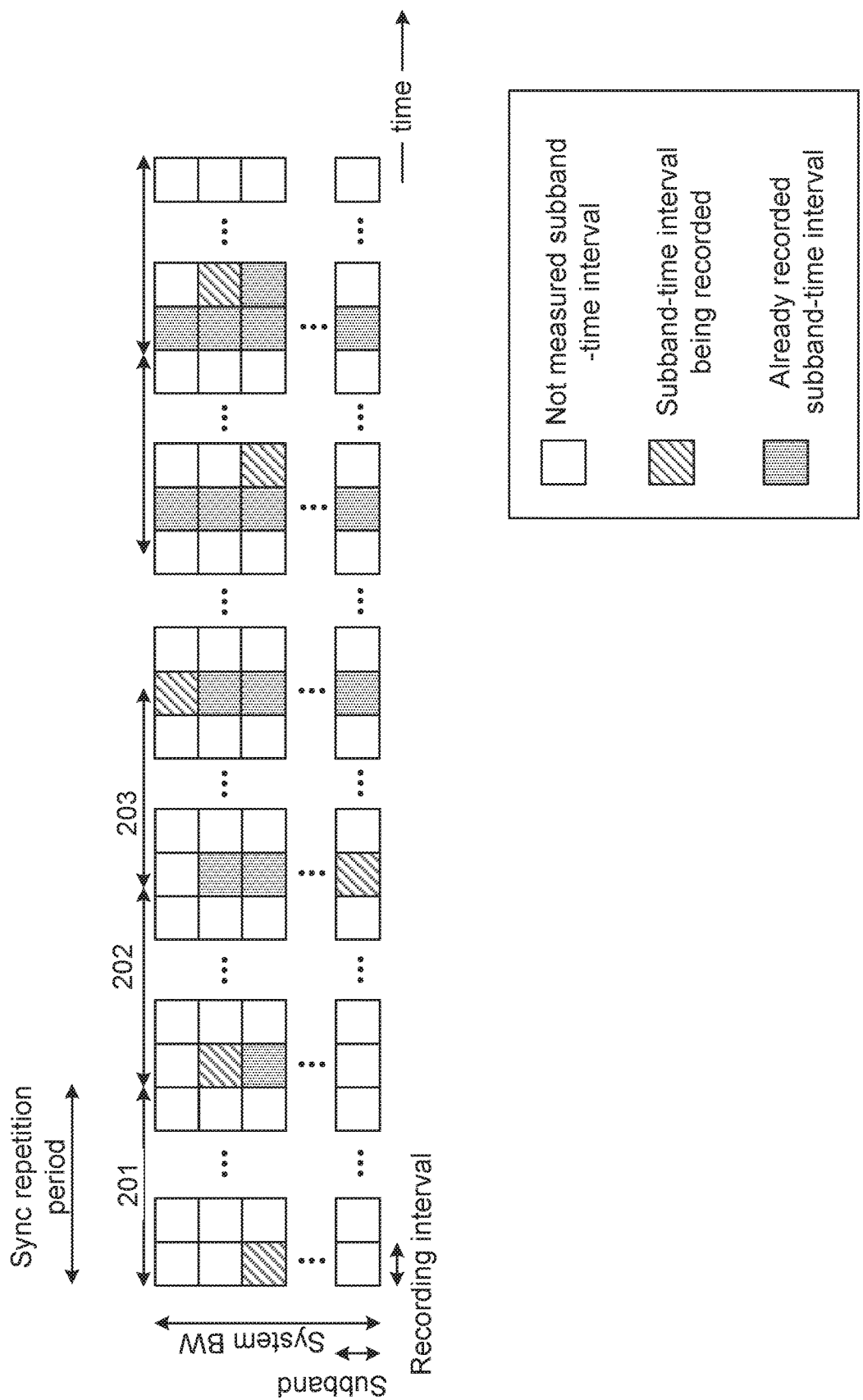
FIG. 2 illustrates examples of time and frequency hopping for cell detection according to embodiments of the present teachings.

FIG. 2 illustrates examples of time and frequency hopping for cell detection according to embodiments of the present teachings. In particular, FIG. 2 illustrates how the communication device (comprising the receiver circuitry 101, 102, 103 described with reference to FIG. 1) may record and process time-frequency resources, i.e., how to record and process subband time intervals.

In the figure, a recording interval is a time interval during which the record and playback unit 103 records the signal input to it, such recording time intervals being shown along a horizontal axis. The recording intervals are, as mentioned earlier, denoted subband time intervals. The total system bandwidth BW is shown along a vertical axis. The total system bandwidth BW is divided into subbands, i.e. a subband comprises part of the frequencies of the total system bandwidth BW. Empty squares indicate subband time intervals during which the communication device does not do any measurement. Squares with dashed lines indicate subband time intervals that are being recorded by the record and playback unit 103. Squares with dots indicate subband time intervals which have already been recorded by the record and playback unit 103.

The communication device is aware of a repetition period of synchronization signals (Sync repetition period, indicated at upper part of figure along the horizontal axis), but needs to find out where to find the synchronization signal. To this end, the communication device (the record and playback unit 103 thereof) may, in a first sync repetition period 201, record a particular subband time interval. In a second sync repetition period 202, the communication device may record another subband time interval. In the second sync repetition period 202 the subband time interval that has already been recorded (during the first sync repetition period 201) is indicated by the dotted square, while a second subband time interval is indicated as being recorded. Correspondingly, in a third sync repetition period 203, subband time intervals recorded in the first and second sync repetition periods 201, 202 are indicated as already recorded, while a third subband time interval is indicated as being recorded. It is noted that the recording of subband time intervals shown in and described with reference to FIG. 2 is provided only as an illustrative example and that many other search strategies may be used.

Figure 3:
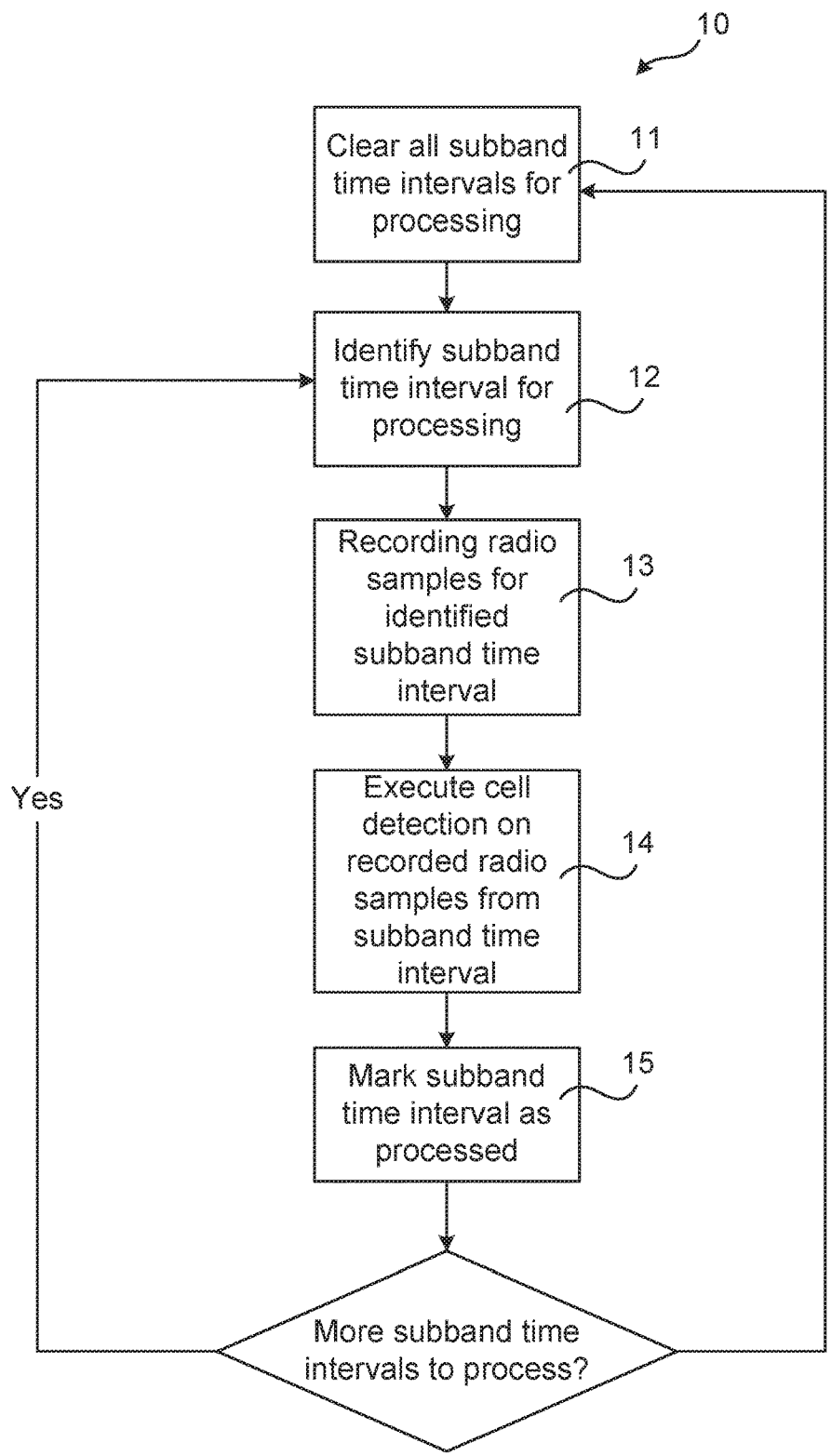
FIG. 3 illustrates a flow chart over steps of a method in a communication device in accordance with the present teachings.

FIG. 3 illustrates a flow chart over steps of a method to in a communication device in accordance with the present teachings.

In box 11, all subband time intervals are cleared for processing. That is, when the control unit 160 initiates the above described intra-frequency neighbor cell measurements it first clears all its previous bookkeeping in order to make all subband time intervals eligible for processing.

In box 12, the control unit 160 then identifies a first subband time interval for processing. As noted earlier, there are various ways in which the communication device may perform the cell detection. For instance, the communication device may be configured to start at a center frequency of a neighboring cell. It is likely that a number of cells have the same center frequency, and the communication device may hence start with the same center frequency as the serving cell have, which center frequency the communication device is aware of. In a subsequent iteration of the flow, a second subband time interval is to be identified. This second subband time interval may be a subband time interval adjacent to the first subband time interval. As yet another example, the communication device may be configured to perform the cell search in a pseudorandom or an entirely random manner.

In box 13, the control unit 160 configures recording of radio samples. Radio samples are recorded for the first subband time interval that was identified in box 12.

In box 14, the control unit 160 executes cell detection on the recorded samples. Depending for instance on the hardware of the control unit (e.g. how fast it can be run), one or more radio samples can be handled in each iteration.

In box 15, the control unit 160 performs a bookkeeping step, marking the particular subband at the particular phase as having been processed. After a subband time interval has been processed, the control unit 160 thus bookkeeps it as already processed until all other such subband time intervals have been processed.

In decision box 16, it is decided whether there are more subband time intervals to process.

If yes, then the above steps (boxes 12, 13, 14, 15) are repeated. These steps (boxes 12, 13, 14, 15 and 16) are repeated until some stop criterion is fulfilled. When all subband time intervals have been processed, the flow continues to box 11 and the control unit 160 may clear the bookkeeping and start all over again.

In one embodiment, the stop criterion is that all subband time intervals have been processed. In another embodiment, the stop criterion is that a certain synchronization signal has been detected in the subband time interval. There are several other options for deciding when to stop processing additional subband time intervals.

In order to avoid that signals from neighbor cells cannot be detected because they partly fall outside the recorded time interval, the time intervals may overlap each other, for instance by overlapping by the number of Orthogonal frequency-division multiplexing (OFDM) symbols spanned by the primary and/or secondary synchronization signal.

In some embodiments the communication device may be capable of recording more than one subband each time, thus speeding up the cell detection process.

In still other embodiments, the time/frequency split might be overlapping.

In some embodiments, the communication device may start its search based on the last found synchronization signal. That is, the communication device first searches for synchronization signal in the last time/frequency window and if it cannot find, it continues by the adjacent time/frequency windows first and so on.

Figure 4:
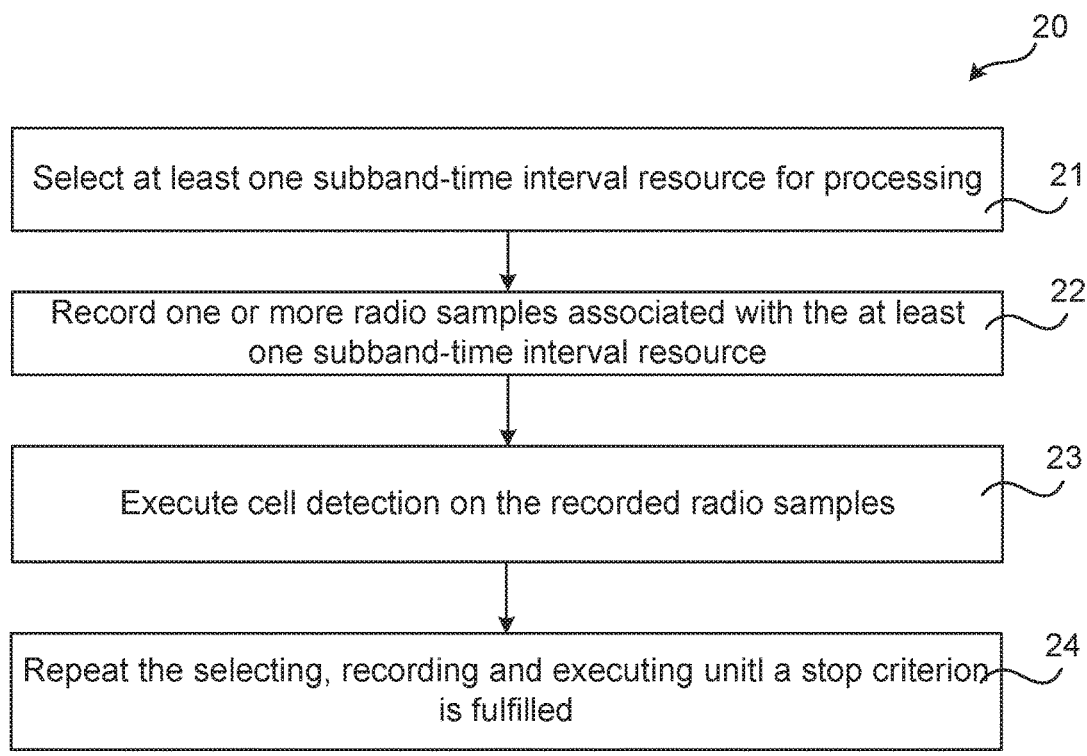
FIG. 4 illustrates a flow chart over steps of an embodiment of a method in a communication device in accordance with the present teachings.

The various features and embodiments that have been described can be combined in many different ways, examples of which are given next with reference first to FIG. 4.

FIG. 4 illustrates a flow chart over steps of an embodiment of a method in a communication device in accordance with the present teachings. A method 20 of neighbor cell detection is provided. The neighbor cell detection may be an intra-frequency detection or an inter-frequency detection. The method may be performed in a communication device 35, which may be any type of device able to communicate over radio frequencies, such as advanced mobile broadband UEs, e.g. smartphones, and low-cost low-power Machine-Type Communications (MTC) devices.

The method 20 comprises selecting 21 at least one subband-time interval resource for processing, wherein each subband is part of a system frequency bandwidth and each time interval is a part of a synchronization signal repetition time period. As described earlier, e.g. in relation to FIGS. 2 and 3, the system frequency bandwidth may be divided into one or more subbands, and the synchronization signal repetition period may be divided into one or more time intervals. A resource grid of size subbands x time intervals may be defined and all resources may be marked as eligible for processing. The selecting 21 may comprise a substep of determining that the subband-time interval resource for processing is a resource that is eligible for processing. The one subband-time interval resource should, for instance, be a resource not already processed.

The method 20 comprises recording 22 one or more radio samples associated with the at least one subband-time interval resource. By recording the radio samples the cell detection processing can be made in non-real-time fashion.

The method 20 comprises executing 23 cell detection on the recorded radio samples. The executing of cell detection may comprise decoding basic information on the neighbor cell, such as for instance physical cell ID or some system information, possibly conveyed in a system information block.

The method 20 comprises repeating 24 the selecting 21, recording 22 and executing 23 until a stop criterion is fulfilled.

The method provides a number of advantages. For instance, the method enables communication devices 35 to do neighbor cell detection without increasing their complexity. In particular, by means of the method 20, the communication device 35 require less memory for storage of radio samples than if the full system bandwidth would be recorded. Further, hardware, such as for instance digital signal processors and hardware accelerators that are used for the cell detection operate at lower sample rate than if the whole system bandwidth would be sampled and stored. Still further, the digital signal processors and hardware accelerators can be more efficiently utilized.

In an embodiment, the method 20 comprises, after finishing the executing 23, marking the at least one subband-time interval resource as having been processed.

In an embodiment, the selecting 21 comprises selecting a subband-time interval resource not marked as having been processed.

In various embodiments, each subband-time interval resource is part of a defined resource grid having as size the number of subbands times the number of time intervals.

In various embodiments, the stop criterion comprises having processed all subband-time interval resources of a defined resource grid having as size the number of subbands times the number of time intervals. In such embodiments, the method 20 ends as it is not possible to select a subband for processing. In other embodiments, the method 20 may comprise a step of determining if the stop criterion is fulfilled, such determining step e.g. being part of the step of repeating.

The processing may, as has been described, comprise down-sampling and recording radio samples associated with the subband-time interval resource, executing cell detection on the recorded data, and marking the resource as having been processed.

In various embodiments, the stop criterion comprises having detected a desired synchronization signal.

In various embodiments, each subband spans at least the bandwidth over which synchronization signals are transmitted.

In various embodiments, the method 20 comprises, before the recording 22, down-sampling of the one or more radio samples. The down-sampling and recording may, for instance, comprise: determining a start and a stop time of the recording, determining a subband to filter and down-sample, determining a down-sampling ratio (BW2 vs BW1), and configuring filter(s), decimator(s) and storage.

In various embodiments, two adjacent time intervals overlap. The overlap may, for instance, be by a time corresponding to a communication resource spanned by the synchronization signal. The synchronization signal may, as exemplified earlier, be a primary synchronization signal and/or a secondary synchronization signal.

In various embodiments, adjacent subbands overlap. The span in frequency domain between subsets may be overlapping. As described earlier, the communication device may search for the synchronization signal anywhere in the system bandwidth, and in some embodiments, the system bandwidth may be split in two and in some embodiments the subband may overlap in frequency.

In various embodiments, the bandwidth of each subband is smaller than the system frequency bandwidth.

Figure 5:
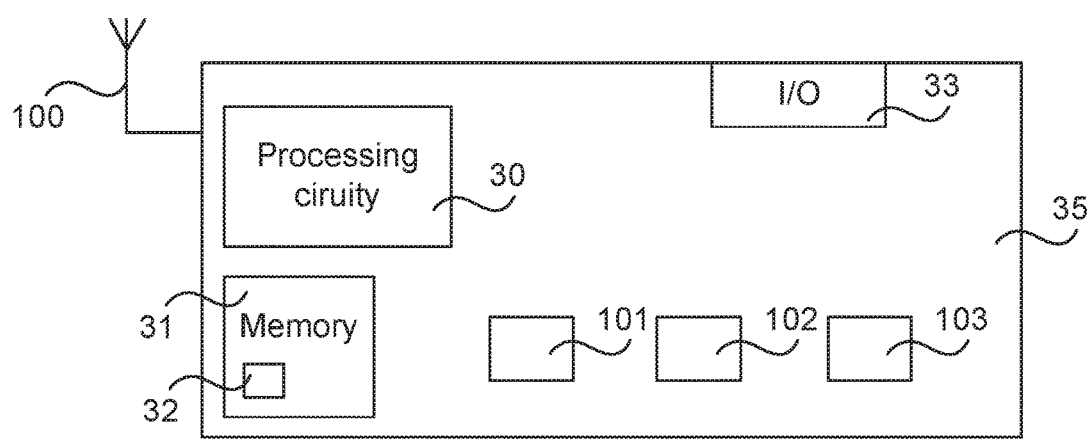
FIG. 5 illustrates schematically a communication device and means for implementing embodiments of the method in accordance with the present teachings.

FIG. 5 illustrates schematically a communication device and means for implementing embodiments of the method in accordance with the present teachings. The communication device 35 may, as mentioned earlier, be any type of wireless communication device, e.g. mobile phone or MTC device.

The communication device 35 comprises processing circuitry 30 which may be any combination of one or more of a suitable central processing unit (CPU), multiprocessor, microcontroller, digital signal processor (DSP), etc., capable of executing software instructions stored in a computer program product 31, e.g. in the form of a storage medium 31. The processing circuitry 30 may further be provided as at least one application specific integrated circuit (ASIC), or field programmable gate array (FPGA).

The processing circuitry 30 is configured to cause the communication device 35 to perform a set of operations, or steps, e.g. as described in relation to FIGS. 3 and 4. For example, the storage medium 31 may store the set of operations, and the processing circuitry 30 may be configured to retrieve the set of operations from the storage medium 31 to cause the communication device 35 to perform the set of operations. The set of operations may be provided as a set of executable instructions. The processing circuitry 30 is thereby arranged to execute methods as disclosed herein.

The storage medium 31 may also comprise persistent storage, which, for example, can be any single one or combination of magnetic memory, optical memory, solid state memory or even remotely mounted memory.

The communication device 35 may further comprise an interface 33 (denoted I/O in the figure) for communications with e.g. network nodes and other communication devices. The interface 33 may e.g. be an interface for a wireless connection, and may comprise one or more input/output devices, antennas, transmitting circuitry, receiving circuitry and/or a protocol stack for communication with other devices or entities. The interface 23 may be used for receiving data input and for outputting data.

The communication device 35 further comprises a Radio Frequency (RF) front end lot, a RF receiver part 102 and a Record and playback unit 103, as described with reference to FIG. 1. Each of these parts 101, 102, 103 comprising e.g. one or more of the components 100, 105, 110, 115, 120, 125, 130, 135, 140, 145, 150, 155, 160, 165, 170 and 175, described with reference to FIG. 1.

A communication device 35 for neighbor cell detection is provided. The communication device 35 is configured to:
  select at least one subband-time interval resource for processing, wherein each subband is part of a system frequency bandwidth and each time interval is a part of a synchronization signal repetition time period,
  record one or more radio samples associated with the at least one subband-time interval resource,
  execute cell detection on the recorded radio samples, and
  repeat the selecting, recording and executing until a stop criterion is fulfilled.

The communication device 35 may be configured to perform the above steps e.g. by comprising one or more processors 30 (or processing circuitry) and memory 31, the memory 31 containing instructions executable by the processor 30, whereby the communication device 35 is operative to perform the steps. That is, in an embodiment, a communication device 35 is provided for neighbor cell detection. The communication device 35 comprises one or more processors 30 and memory 31, the memory 31 containing instructions executable by the processor 30, whereby the communication device 35 is operative to: select at least one subband-time interval resource for processing, wherein each subband is part of a system frequency bandwidth and each time interval is a part of a synchronization signal repetition time period; record one or more radio samples associated with the at least one subband-time interval resource; execute cell detection on the recorded radio samples; and repeat the selecting, recording and executing until a stop criterion is fulfilled.

In an embodiment, the communication device 35 is configured to, after finishing the executing, mark the at least one subband-time interval resource as having been processed.

In various embodiments, the communication device 35 is configured to select a subband-time interval resource not marked as having been processed.

In various embodiments, each subband-time interval resource is part of a defined resource grid having as size the number of subbands times the number of time intervals.

In various embodiments, the stop criterion comprises having processed all subband-time interval resources of a defined resource grid having as size the number of subbands times the number of time intervals.

In various embodiments, the stop criterion comprises having detected a desired synchronization signal.

In various embodiments, each subband spans at least the bandwidth over which synchronization signals are transmitted.

In various embodiments, the communication device 35 is configured to, before the recording, down-sample the one or more radio samples.

In various embodiments, two adjacent time intervals overlap.

In various embodiments, two adjacent subbands overlap.

In various embodiments, the bandwidth of each subband is smaller than the system frequency bandwidth.

Figure 6:
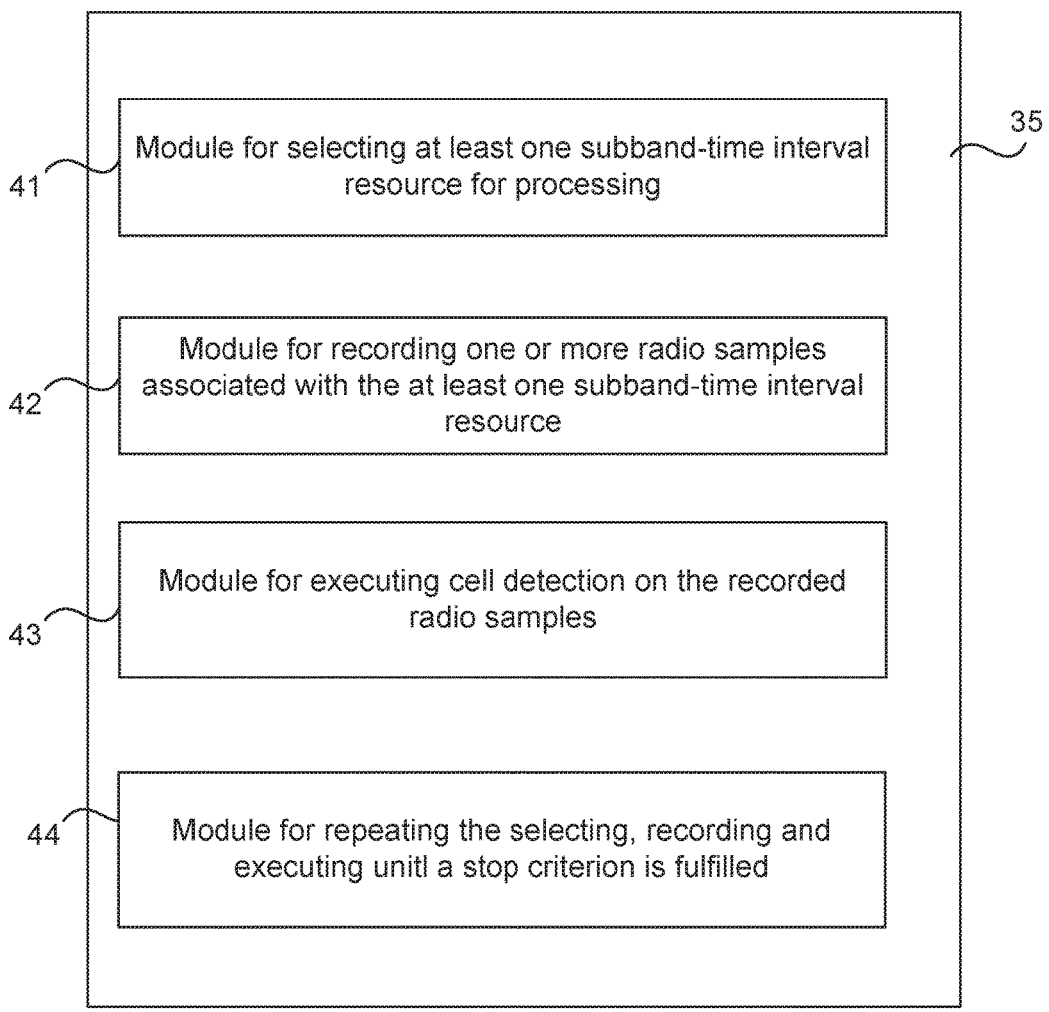
FIG. 6 illustrates a communication device comprising function modules/software modules for implementing embodiments of the present teachings.

FIG. 6 illustrates a communication device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A communication device 35 is provided for intra-frequency neighbor cell detection. The communication device comprises a first module 41 for selecting at least one subband-time interval resource for processing, wherein each subband is part of a system frequency bandwidth and each time interval is a part of a synchronization signal repetition time period. The first module 41 may, for instance, comprise processing circuitry adapted for performing such selection.

The communication device comprises a second module 42 for recording one or more radio samples associated with the at least one subband-time interval resource. Such second module 42 may, for instance, comprise the earlier described record and playback unit 103. As another example, the second module 42 may comprise processing circuitry adapted for recording radio samples.

The communication device comprises a third module 43 for executing cell detection on the recorded radio samples. The third module 43 may, for instance, comprise the earlier described cell detection unit 155. As another example, the third module 43 may comprise processing circuitry adapted for performing cell detection.

The communication device comprises a fourth module 44 for repeating the selecting, recording and executing until a stop criterion is fulfilled. The fourth module 44 may, for instance, comprise processing circuitry adapted for initiate a repeating until detecting that a stop criterion is fulfilled.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of neighbor cell detection performed by a communication device operating in a cellular communication system, the method comprising:

selecting, for processing, at least one subband-time interval resource out of a plurality of subband-time interval resources, wherein each subband is part of a system frequency bandwidth and has a subband bandwidth smaller than the system frequency bandwidth and each time interval is a part of a synchronization signal repetition time period that defines how much time elapses between transmissions of a synchronization signal by each neighbor cell in the cellular communication system, and wherein each synchronization signal can be located at any frequency within the system frequency bandwidth, recording one or more radio samples associated with the at least one subband-time interval resource, executing cell detection on the recorded radio samples, wherein cell detection comprises searching for the synchronization signal in the recorded radio samples, and repeating the selecting, recording and executing until a stop criterion is fulfilled.

2. The method as claimed in claim 1, comprising, after finishing the executing, marking the at least one subband-time interval resource as having been processed.

3. The method as claimed in claim 2, wherein the selecting comprises selecting a subband-time interval resource not marked as having been processed.

4. The method as claimed in claim 1, wherein each subband-time interval resource is part of a defined resource grid having as size the number of subbands times the number of time intervals.

5. The method as claimed in claim 1, wherein the stop criterion comprises having processed all subband-time interval resources of a defined resource grid having as size the number of subbands times the number of time intervals.

6. The method as claimed in claim 1, wherein the stop criterion comprises having detected a desired synchronization signal.

7. The method as claimed in claim 1, wherein each subband spans at least the bandwidth over which synchronization signals are transmitted.

8. The method as claimed in claim 1, comprising, before the recording, down-sampling of the one or more radio samples.

9. The method as claimed in claim 1, wherein two adjacent time intervals overlap.

10. The method as claimed in claim 1, wherein two adjacent subbands overlap.

11. A nontransitory computer readable medium comprising a computer program for a communication device, the computer program comprising computer program code, which, when run on a processing circuitry of the communication device causes the communication device to perform a method of neighbor cell detection performed by a communication device operating in a cellular communication system, the method comprising:

selecting, for processing, at least one subband-time interval resource out of a plurality of subband-time interval resources, wherein each subband is part of a system frequency bandwidth and has a subband bandwidth smaller than the system frequency bandwidth and each time interval is a part of a synchronization signal repetition time period that defines how much time elapses between transmissions of a synchronization signal by each neighbor cell in the cellular communication system, and wherein each synchronization signal can be located at any frequency within the system frequency bandwidth, recording one or more radio samples associated with the at least one subband-time interval resource, executing cell detection on the recorded radio samples, wherein cell detection comprises searching for the synchronization signal in the recorded radio samples, and repeating the selecting, recording and executing until a stop criterion is fulfilled.

12. A communication device for neighbor cell detection in a cellular communication system, the communication device being configured to:

select, for processing, at least one subband-time interval resource out of a plurality of subband-time interval resources, wherein each subband is part of a system frequency bandwidth and has a subband bandwidth smaller than the system frequency bandwidth and each time interval is a part of a synchronization signal repetition time period that defines how much time elapses between transmissions of a synchronization signal by each neighbor cell in the cellular communication system, and wherein each synchronization signal can be located at any frequency within the system frequency bandwidth, record one or more radio samples associated with the at least one subband-time interval resource, execute cell detection on the recorded radio samples, wherein cell detection comprises searching for the synchronization signal in the recorded radio samples, and repeat the selecting, recording and executing until a stop criterion is fulfilled.

* * * * *

UNITED STATES PATENT AND TRADEMARK OFFICE
CERTIFICATE OF CORRECTION

PATENT NO. : 10,334,453 B2  
APPLICATION NO. : 15/470305  
DATED : June 25, 2019  
INVENTOR(S) : Axmon et al.

Page 1 of 1

It is certified that error appears in the above-identified patent and that said Letters Patent is hereby corrected as shown below:

In the Specification

Column 1, Line 41, delete "too kHz" and insert -- 100 kHz --, therefor.

Column 2, Line 14, delete "too ms" and insert -- 100 ms --, therefor.

Column 3, Line 66, delete "passed to through" and insert -- passed through --, therefor.

Column 5, Line 28, delete "method to" and insert -- method 10 --, therefor.

Column 7, Line 59, delete "communication device" and insert -- communication device 35 --, therefor.

Column 8, Line 38, delete "lot," and insert -- 101, --, therefor.

Signed and Sealed this  
Eleventh Day of February, 2020

Andrei Iancu  
*Director of the United States Patent and Trademark Office*